(12) United States Patent
Halt et al.

(10) Patent No.: US 12,457,187 B2
(45) Date of Patent: Oct. 28, 2025

(54) ELECTRONIC SYSTEM AND METHOD FOR FACILITATING SOUND MEDIA AND ELECTRONIC COMMERCE BY SELECTIVELY UTILIZING ONE OR MORE SONG CLIPS

(71) Applicants: Megan H. Halt, Media, PA (US); Tara R. Halt, Media, PA (US)

(72) Inventors: Megan H. Halt, Media, PA (US); Tara R. Halt, Media, PA (US)

( * ) Notice: Subject to any disclaimer, the term of this patent is extended or adjusted under 35 U.S.C. 154(b) by 0 days.

(21) Appl. No.: 17/840,683

(22) Filed: Jun. 15, 2022

(65) Prior Publication Data

US 2022/0321522 A1 Oct. 6, 2022

Related U.S. Application Data

(63) Continuation of application No. 17/026,089, filed on Sep. 18, 2020, now Pat. No. 11,381,538, which is a continuation of application No. 15/673,189, filed on Aug. 9, 2017, now abandoned, which is a continuation of application No. 14/491,512, filed on Sep. 19, 2014, now abandoned.

(60) Provisional application No. 61/880,600, filed on Sep. 20, 2013.

(51) Int. Cl.
*H04L 51/52* (2022.01)
*H04L 51/10* (2022.01)

(52) U.S. Cl.
CPC .............. *H04L 51/52* (2022.05); *H04L 51/10* (2013.01)

(58) Field of Classification Search
None
See application file for complete search history.

(56) References Cited

U.S. PATENT DOCUMENTS

| | | | |
|---|---|---|---|
| 7,187,947 B1 | 3/2007 | White et al. | |
| 11,381,538 B2 * | 7/2022 | Halt | ........................ H04L 51/10 |
| 2006/0248105 A1 | 11/2006 | Goradia | |
| 2007/0196806 A1 | 8/2007 | Ljungman et al. | |
| 2008/0139311 A1 | 6/2008 | Bates et al. | |
| 2008/0220797 A1 | 9/2008 | Meiby et al. | |
| 2009/0165087 A1 | 6/2009 | Jachner et al. | |
| 2012/0030230 A1 | 2/2012 | Sheinkop et al. | |
| 2012/0116766 A1 | 5/2012 | Wasserblat et al. | |
| 2012/0179757 A1 | 7/2012 | Jones et al. | |
| 2013/0006627 A1 | 1/2013 | Guthery et al. | |
| 2013/0070093 A1 | 3/2013 | Rivera et al. | |
| 2013/0275506 A1 | 10/2013 | Warner | |
| 2014/0076125 A1 | 3/2014 | Kellett et al. | |

(Continued)

*Primary Examiner* — Wilson Lee
(74) *Attorney, Agent, or Firm* — Volpe Koenig

(57) ABSTRACT

A system and method permit users to selectively search for, and identify short segments (called snippets) of music. The user may enter one or more search terms for which they are searching within a database of musical selections. Once the search terms have been defined, the user initiates the search by selecting the search button. The system searches for one or more of the musical selections that most closely match the user's search parameters, and returns those musical selections as search results back to the user. The user then selects one of the results of the search that they like best. Once the selection is made, the user may input recipient information for the person to which they would like to send this musical selection. This musical selection may then be sent to the recipient by the system.

20 Claims, 18 Drawing Sheets

(56) References Cited

U.S. PATENT DOCUMENTS

| | | |
|---|---|---|
| 2014/0164507 A1 | 6/2014 | Tesch et al. |
| 2014/0181218 A1 | 6/2014 | Roberts et al. |
| 2014/0188997 A1 | 7/2014 | Schneiderman et al. |
| 2014/0337374 A1 | 11/2014 | Glass |
| 2014/0337761 A1* | 11/2014 | Glass .................... H04L 65/403 715/753 |
| 2015/0019660 A1 | 1/2015 | Odonnell-Dunn |
| 2015/0039982 A1 | 2/2015 | Bastide |
| 2015/0058758 A1 | 2/2015 | Tseng |
| 2015/0128788 A1 | 5/2015 | Brewer |
| 2015/0213001 A1 | 7/2015 | Levy |
| 2015/0301718 A1 | 10/2015 | Trollope et al. |
| 2016/0072755 A1 | 3/2016 | Su et al. |
| 2016/0188181 A1* | 6/2016 | Smith ................. G06F 3/04886 715/765 |
| 2017/0270159 A1* | 9/2017 | Wang ................. G06F 16/2425 |

* cited by examiner

TYPE IN WORD(S), PHRASE OR THOUGHT THAT YOU WOULD LIKE TO MATCH

[I LIKE YOU] — 1604

MAKE ADDITIONAL SELECTIONS

☐ GENRE — 1606
☐ PLAYLISTS — 1608
☐ SONGS — 1610
☐ ARTIST — 1612
☐ ALBUM — 1614
☐ COMPOSERS — 1616
☑ LYRICS — 1618
☑ TITLE — 1620

☐ COMPILATIONS — 1622
☐ FAVORITES — 1624
☐ MUSICAL BUDDY — 1626
☐ SONG MATCH — 1628
☐ LENGTH OF SELECTION — 1630

ATTACHMENTS? [Y/N] — 1632
If yes
☐ PICTORAL — 1634
☐ VIDEO — 1636
☐ TEXT — 1638
☐ AUDIO FILE — 1640
☐ GIFT — 1642

GAMEPLAY [Y/N] — 1644

FIG. 16

ELECTRONIC SYSTEM AND METHOD FOR FACILITATING SOUND MEDIA AND ELECTRONIC COMMERCE BY SELECTIVELY UTILIZING ONE OR MORE SONG CLIPS

CROSS REFERENCE TO RELATED APPLICATIONS

This application is a continuation of U.S. patent application Ser. No. 17/026,089 filed Sep. 18, 2020, which is a continuation of U.S. patent application Ser. No. 15/673,189 filed Aug. 9, 2017 (abandoned), which is a continuation of U.S. patent application Ser. No. 14/491,512 filed Sep. 19, 2014 (abandoned) which claims the benefit of U.S. provisional application No. 61/880,600 filed Sep. 20, 2013, which are incorporated by reference as if fully set forth.

FIELD OF INVENTION

The present invention is related to communication systems. More particularly, the present invention is a system and method for social networking allowing people to utilize songs, lyrics, titles and other information such as pictures, videos, texts, email and other social networking sites to communicate with other users. The invention also facilitates e-commerce in the purchasing of songs, ring tones and other merchandise.

BACKGROUND

In many cultures, there are few things as endearing and sacred as song. People are raised in a certain culture, and many of the special aspects of a culture along with food, family and entertainment are the songs with which people are raised.

Songs can provide an inspiration to what lies ahead, or may take a person back, to reminisce for what was once beloved. There are a few things that evoke such strong emotions as those to a song.

Although songs have become ubiquitous along with modern technology through the use of iPod and MP3 players or musical players on smart phones, there is still a disconnect. Whereas in the past, people would gather together to talk, eat, and enjoy music, modern technology has fostered the scattering of people to distant places. As a result, people don't often get together and experience music along with other forms of culture in the same manner as in past. Although songs are still an important part of many cultures, it has become more difficult to experience songs together as technology advances.

The Internet has enabled a plethora of new forms of communication. Email, texts and instant messaging have replaced paper mail and faxes as the primary means of communication between both businesses and consumers. For example, instant messaging and texting are different forms of communication that have enabled people to be more productive in their daily lives. However, the Internet has also caused a huge revolution in communication in social networks. In particular, FACEBOOK has captured a younger generation of people who use it as their primary mode of communication among friends, family members and acquaintances.

TWITTER is also another form of communication that allows small amounts of information to be sent to one or more people. Another form of communication for pictures can be found with SNAPCHAT and PINTEREST, which allow pictures to be sent to people in one's social network. VINE has emerged as a similar social network for videos. All of these forms of communication attempt to meet a particular need, or are suited to a person's particular taste, for a certain type of communication at that time.

The music industry has also been greatly transformed with the advent of the Internet. At first, the technology associated with the distribution of music was cumbersome. However, as that technology advanced, illegal sharing of music proliferated. Sharing or copying of songs was a huge legal issue in the early 2000s between NAPSTER and the music companies. This almost devastated the industry until APPLE introduced ITUNES. APPLE made it simple to easily buy and download music in a legal framework. Since then, there have been many alternatives to download songs through ITUNES and other legitimate song outlets.

Music is important to many peoples' lives as it gives them a way to identify with a particular situation, or capture a thought, or emphasize or attempt to change their mood. People identify very personally with their tastes in music.

While the Internet has enabled many different forms of communication, there still is a need for communication that seamlessly works with music. A better form of communication using music is greatly needed.

SUMMARY

The present invention is a system and method, which permit users to selectively search for, and identify short segments (called snippets) of music. The user may enter one or more words, thoughts or phrases for which they are searching within a database of musical selections.

The user may optionally refine the search by selecting other parameters such as the length of the snippet, identifying characteristics such as the song title, the album title or the actual lyrics of the snippet and other information related to one or more songs. Once the search terms have been defined, the user initiates the search by selecting the search button.

The system searches for one or more of the musical selections associated with the user's search parameters, or that most closely match the user's search parameters, and returns those musical selections as search results back to the user. The user then selects one of the results of the search that they like best.

Once the selection is made, the user may input recipient information for the person to which they would like to send this musical selection. This musical selection may then be sent to the recipient by the system.

These and other embodiments will be explained in greater detail with respect to the drawing figures.

BRIEF DESCRIPTION OF THE DRAWINGS

FIG. 16 shows an alternative embodiment of the invention which provides more customize search parameters then the embodiment shown in FIG. 1.

DETAILED DESCRIPTION OF THE PREFERRED EMBODIMENTS

The present invention will be described hereinafter with reference to the drawings, where like numerals represent like elements throughout.

The present invention permits a person to input one or more words, hereinafter referred to collectively as "search terms" and perform a search for one or more songs or other related information related to the search term. The purpose of this search is to allow one individual to compile and send a musical message instantaneously to one or more recipients.

Regardless of the particular type of end device, (mobile or stationary), or the particular type of access, (such as a web browser, email client, app or other type of interface), the functionality as viewed by the user is generally the same, as will be described hereinafter. In one example, a web browser may be opened to the website which utilizes the present invention. Although the present invention will be described in an embodiment of a website, those of skill in the art would realize that the teachings hereinafter show that the invention may be utilized on a mobile device utilizing an app, or may be utilized on a desk top or laptop utilizing a web browser, or a combination thereof.

Figure 1:
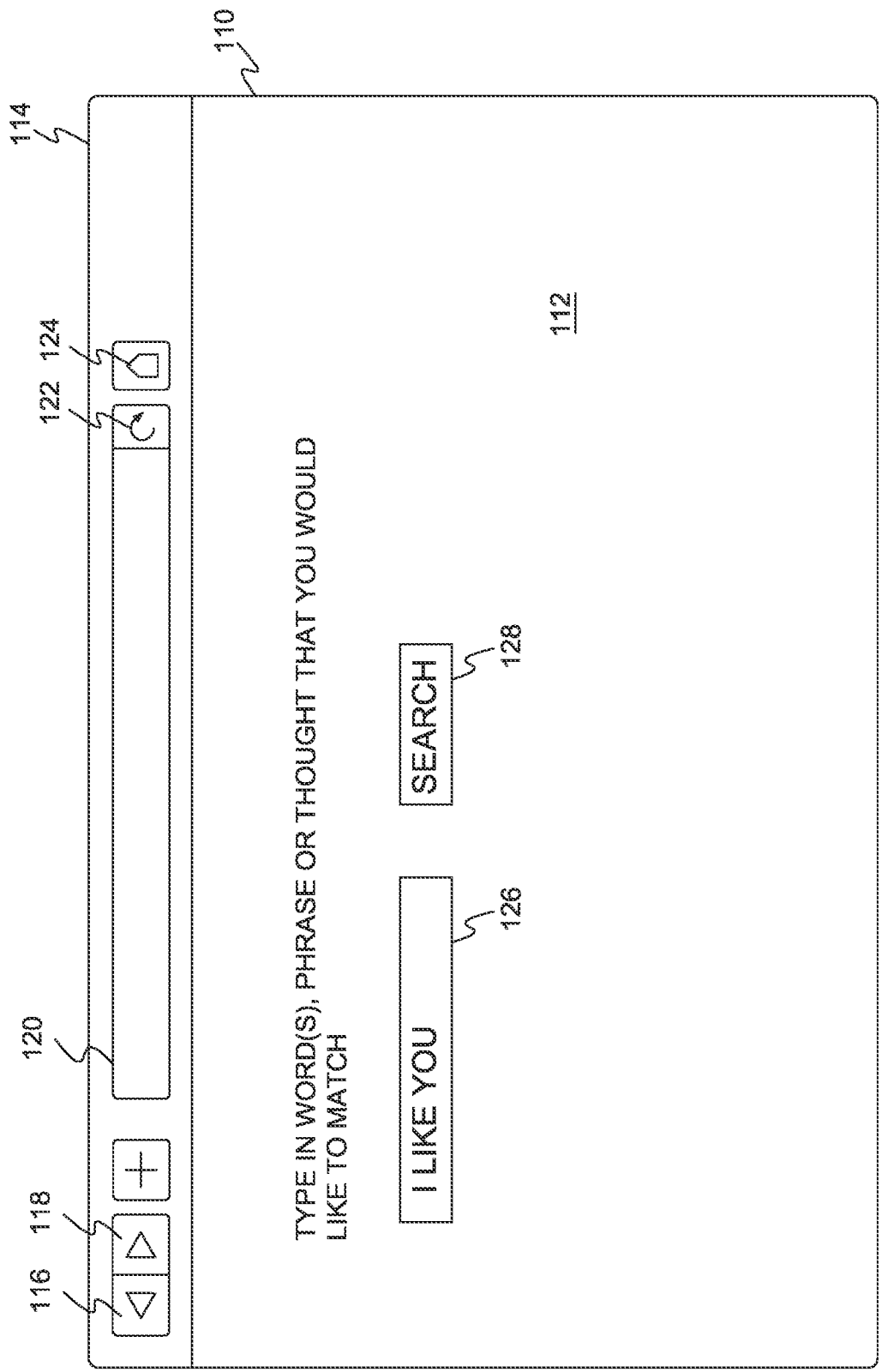
FIG. 1 is an example search window in accordance with an embodiment of the invention.

Referring to FIG. 1, a web browser window 110 accessing a web page 112 is shown. As will be described in detail below, the web page 112 may include display elements that prompt the user for information. The web page 112 may be included in a web browser window 110. The web browser window 110 may include a control area 114 that includes a back button 116, forward button 118, address field 120, refresh button 122, and home button 124. The control area 114 may also include one or more additional control elements (not depicted). The user may select the control elements 116, 118, 120, 122 and 124 in the control area 114. The selection may be performed, for example, by the user clicking a mouse or providing input via keyboard, touch screen, and/or other type of input device. When one of the elements 116, 118, 120, 122 and 124 is selected, the web browser window 110 will change to reflect the action to be taken. For example, when the refresh button 122 is selected, the web browser window 122 will be refreshed to accurate display the webpage currently viewed in the web browser window 112.

As would be understood by those of skill in the art, a web browser may not be necessary as a user may log directly into a website or use an app to utilize the present invention.

Referring back to FIG. 1, the web browser window 112 displays a search field 126 for entering a search term. The search term may be a word or multiple words. As shown, the search field 126 permits a user to type one or more search terms. The user in this example has input the search term "I like you". The user then selects the search button 128 to initiate the search, and the system returns one or more search results that relate to the search term "I like you". This is shown in FIG. 2.

Figure 2:
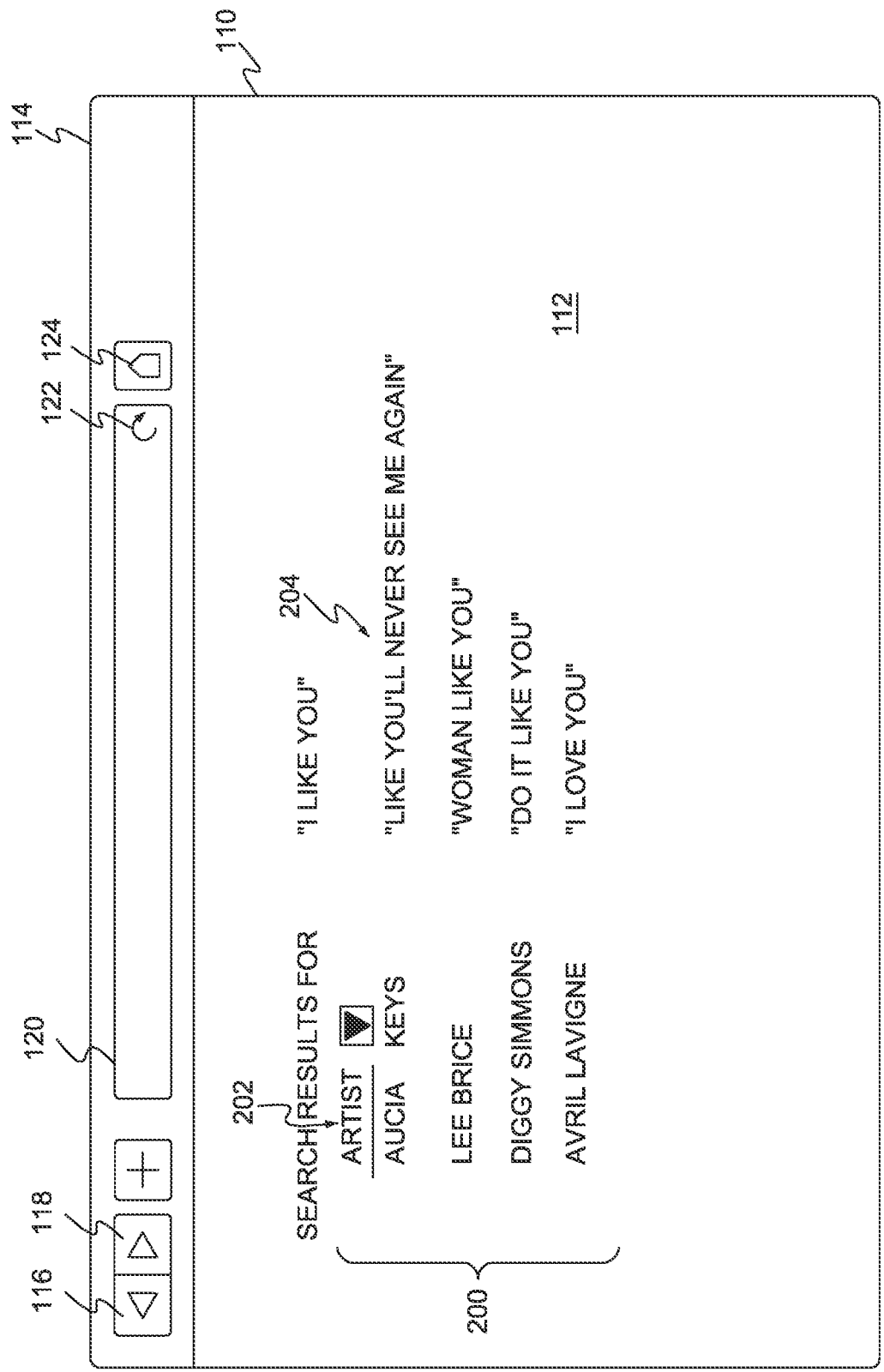
FIG. 2 shows the search results in accordance with the search term of FIG. 1.

Referring to FIG. 2, a database is searched for items that match, or most closely match, the search term. These items can consist of song lyrics, artists, genres, a song label, or in an alternative embodiment, merchandise or other items. All of these different possible results can be displayed to the user, and the user then selects one or more songs which can be sent in a musical message. In the example shown in FIG. 1, the user has input the search term, "I like you". The user may then select the search button 128 to initiate the search. The search may be performed utilizing any of the available search engines available now, or future developed.

The search may be made more directly. The lyrics that most closely match the search term and, optionally, the artist may be determined. An artist could be listed among the list of results from the system either by a specific search for that artist, or because the artist had been correlated with that phrase.

In an alternative, a correlation may be created in the program between certain genres of music, phrases, and artists, and the an "emotion" or "thought" that the song evokes. This concept can be explained by the use of a specific song. For example, consider Five for Fighting's song, "100 Years." This song has the genre of soft rock. Additionally, additional "tags" may be associated with the song such as "relaxing" or "nostalgic". Continuing, Five for Fighting has the tendency to write songs about "longing" or "confusion" in life matters. Associating these "tags" with a song, album or an artist, just as an example, a relation may be made between these feelings (embodied as "tags") and a word or phrase that the prospective user may choose to search on. These relations would be more abstract, and would depend on correlations between feelings, emotions, and things of that nature. This requires that one or more tags be associated with the terms that the user is searching.

Regardless of the searching method, the search results 200 are returned to the user as shown in FIG. 2. These search results 200 may be derived from all of the search options as previously set forth herein. In this example, the search results 200 include the artist 202, and an "abbreviated version" (i.e. a few words) or snippet 202. However, it should be understood by those of skill in the art that in addition to the search results 200 as shown, additional information may be returned along with the search results 200 shown in FIG. 2. For example, the album and/or more detailed information regarding the artist, as well as the label or other songs by the artist or the label.

Although the present invention has been described above as having the search results 200 graphically returned to the user, in an alternative embodiment, the search results 200 may be audibly played back to the user.

Additionally, although FIG. 2 shows only a snippet for each search term, those of skill in the art would realize that more or less of the lyrics of the song may be displayed, as desired by the user. The user may be provided with the option of selecting the size of the snippet; either a specific number of words, a stanza or the entire song.

Furthermore, although the user will have the search results 200 including the artist 202 and a snippet 204 of the song, they will have the option of using different lyrics of that same song by double clicking on the song, which will provide all of the lyrics of the song. This is particularly helpful in those situations where the user would like to double check that the context of the lyrics is similar to the message that the user is attempting to convey.

After the search term is input into the search field 126, a list of results is returned to the user. As those of skill in the art would appreciate, the search engine may perform an exact match of search terms, (i.e. only return results that match the terms "I", "like" or "you", or results that include any combination of any of those terms. Alternatively, the search engine may match similar terms, whereby it may return both combinations of exact matches of those terms or combinations of synonyms of those terms. Using the present example, search results including the terms "love", "adore" or "amore" may be returned in response to the term "like" being input. As those of skill in the art would recognize, many currently available search engines may be utilized, even if they are not as comprehensive in the number and variety of synonyms that will be returned in the search results.

Figure 3:
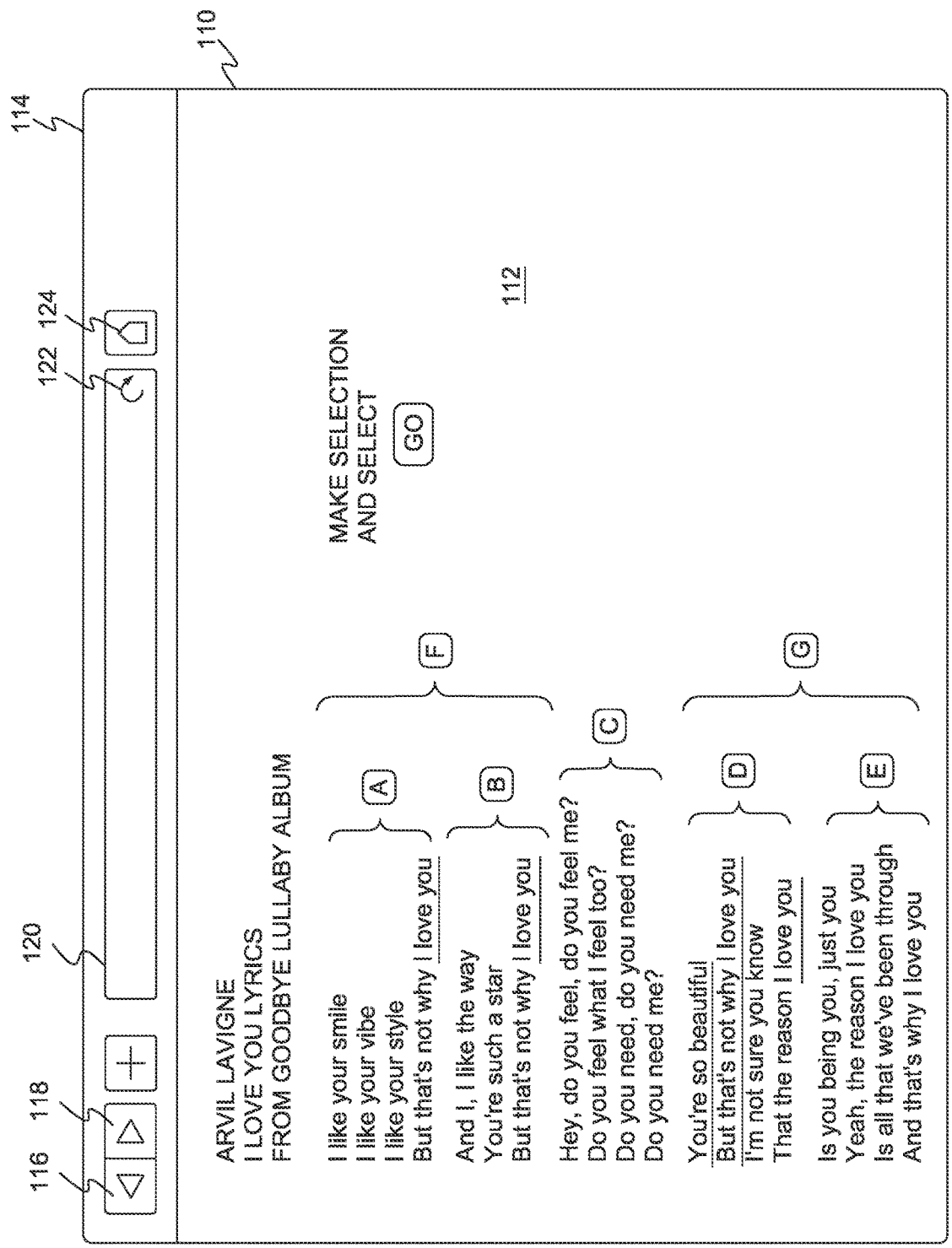
FIG. 3 shows more detail presented after selection of one of the search results of FIG. 2 presented to the user.

Referring to FIG. 3, once the list of search results 200 is displayed to the user, the user will then make their choice from the displayed search results 200. For explanation purposes, the choice is Avril Lavigne's "I Love You". As a result of the selection, the lyrics of the song "I Love You" are presented to the user, and the user makes a selection of the particular lyrics and accompanying song portion that they would like.

A selection of lyrics may be made in many different ways. For example, the lyrics relating to the search terms may be highlighted as shown in the underlined words in FIG. 3.

In a first alternative, the system may highlight an extended selection as shown in the underlined portion of section D of FIG. 3.

In a second alternative, each verse A, B, C, D and E may be tagged for selection, or extended sections F and G may be tagged as shown in FIG. 3.

In a third alternative, the user may simply highlight the selection in which they are interested.

In a fourth alternative, the user may indicate that they desire a specific time period of the song, and they input this duration for selection. As those of skill in the art would understand, there may be many different methods for either pre-selecting or custom selecting the desired lyrics. These methods can come from utilizing one of the alternatives mentioned, as well as combining one or more of the alternatives to fit the user's likes or dislikes for his or her musical message. Any of these alternatives previously set forth may be utilized as described herein.

Regardless of the specific selection by the user, ultimately a selection is made by the user. For explanation purposes, the user decides on section G of the displayed lyrics in FIG. 3. This is done by highlighting the desired selection and clicking the GO button as shown in FIG. 3. The user may be presented with the option of confirming the selection, for example by a message showing the particular selection and asking "Are you sure this is the selection that you would like to send?"

Once confirmed by the user, a musical message for sending to a recipient is generated. The musical message may be embodied as an email, an SMS, a Facebook message, an instant message, a text or any other type of electronic communication. However, for purposes of clarification and ease of explanation, the invention will be described hereinafter with reference to an email.

Figure 4:
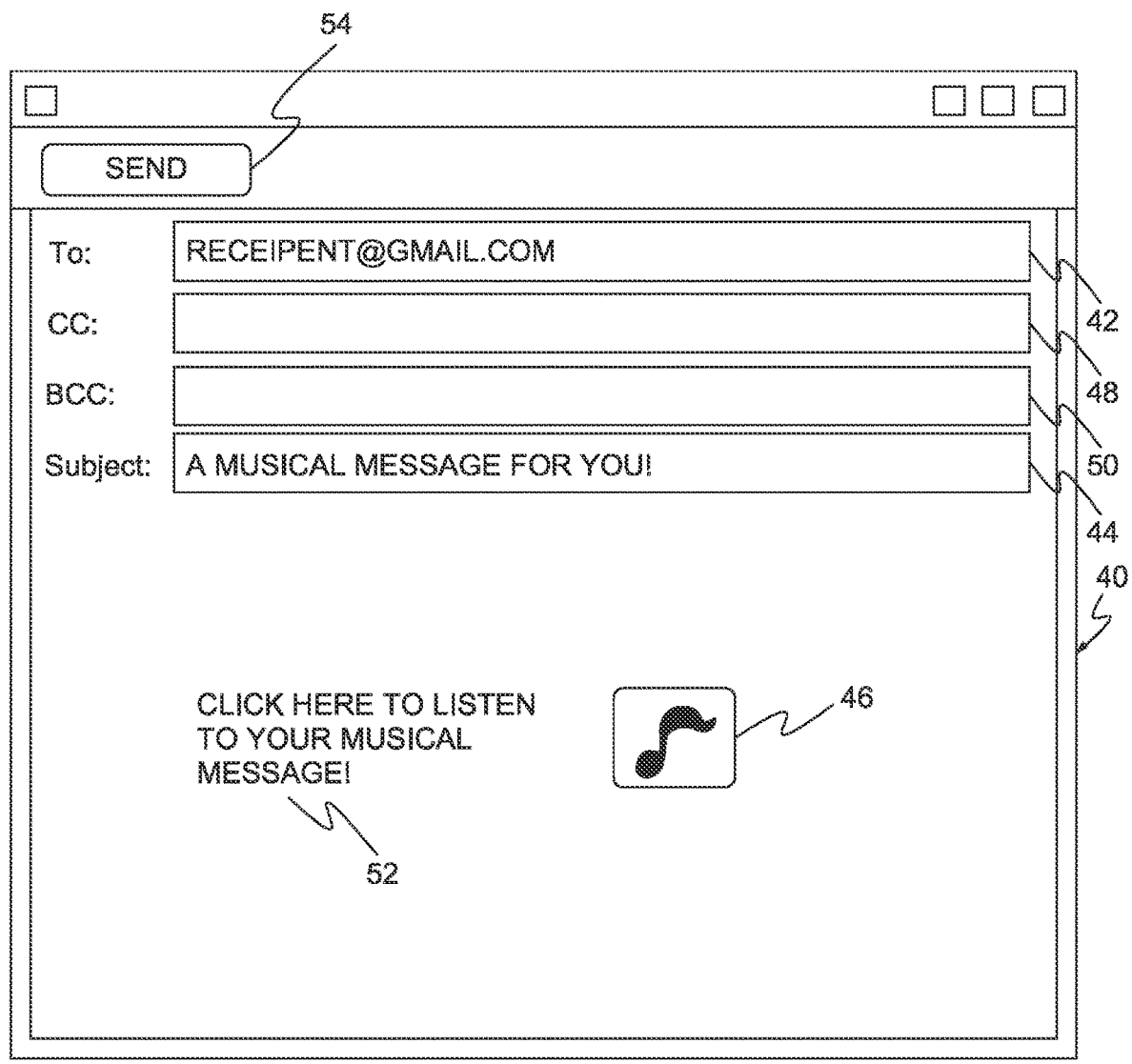
FIG. 4 is a musical message created by a specific selection of FIG. 3.

Referring to FIG. 4, a musical message 40 in the format of an email is shown. The musical message 40 includes a recipient's contact information 42, a CC: field 48, a BCC field 50, an optional textual message or instructions 52, a subject line 44 and a link 46 (hereinafter referred to as the musical icon), to access the musical selection, (hereinafter referred to as the musical payload (not shown)). The musical icon 46 may be a hyperlink to a musical file that is stored in the cloud, or may be an actual attached audio file, for example a way, mp3, a raw audio file or any other type of audio file format. The musical icon 46 operates as follows: when the recipient clicks on the musical icon 46, the music selection will played for the recipient.

The musical icon 46 will be sent to the recipient when the sender is content with the message he/she has composed. Depending on personal preferences, the present invention may have access to the user's contact information, whereby they user may select from a plurality of the user's contacts, streamlining the process of sending the message to one or more recipients by avoiding the necessity of typing in the entire email address of the one or more recipients. When the user is satisfied that the musical message 40 is ready for transmission to one or more recipients, they select the send button 54 to send the musical message 40 in the form of an email.

Figure 5:
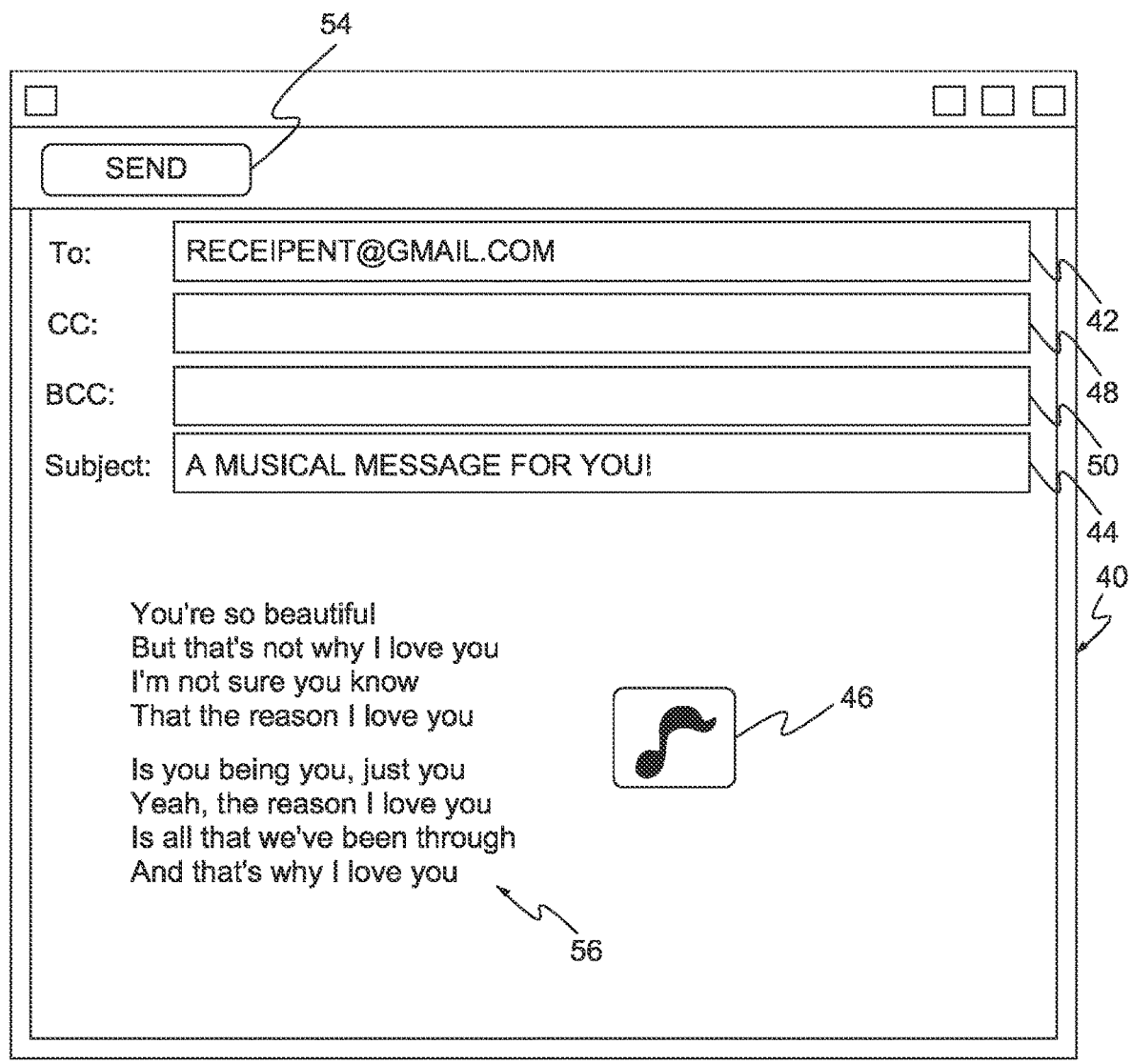
FIG. 5 is an alternative embodiment of the musical message of FIG. 4 including lyrics in textual format.

In an optional embodiment shown in FIG. 5, an alternative format of a musical message 40 having the lyrics included in textual format 56 in the musical message 40. This is convenient for the recipient as they are able to read the lyrics as the music is playing, to ensure that there is no misunderstanding as to the exact lyrics being sent. In this format, the lyrics may be highlighted to guide the recipient as they listen to the audio file. It should be noted that although the musical message 40 is shown in FIG. 5 as including the lyrics in textual format 56 within the musical message 40, this is just one example, as sending the lyrics in textual format 56 is optional.

Figure 6:
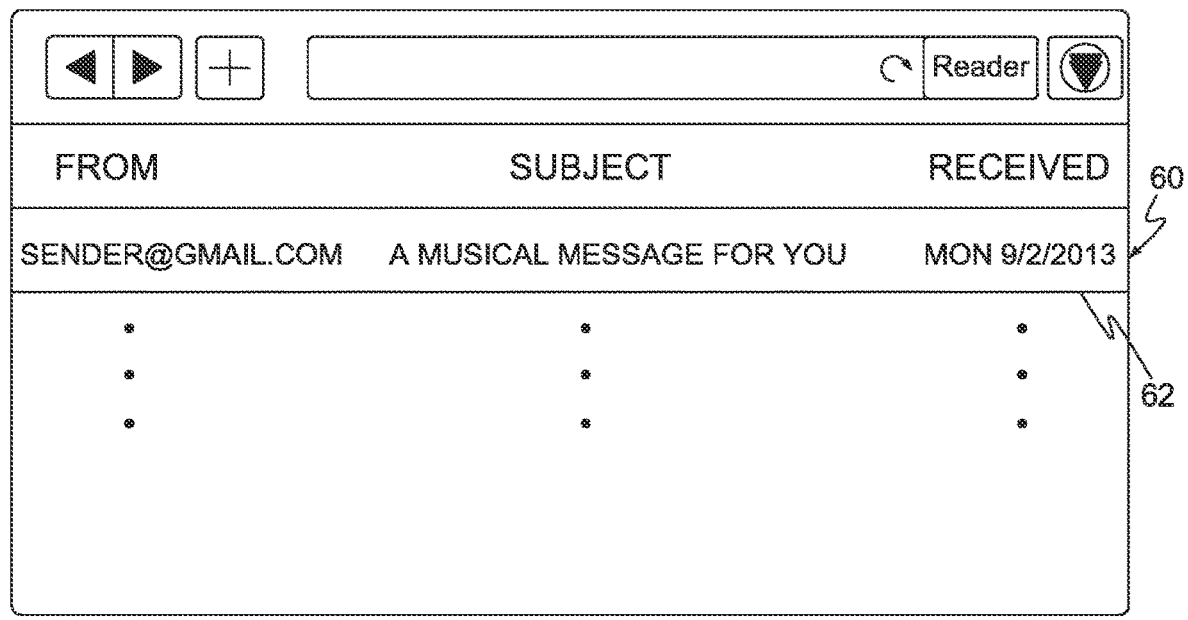
FIG. 6 shows the musical message being received by the recipient in the form of an email.

Additionally, although the musical message 40 is shown in FIGS. 4 and 5 as comprising an email, it should be understood by those of skill in the art that the message may comprise a text, an instant message, a notification within an app or any other type of electronic notification. For example, as shown in FIG. 6, a recipient's email inbox 60 is shown, with the musical message 40 being received by the recipient in the form of an email 62.

Figure 7:
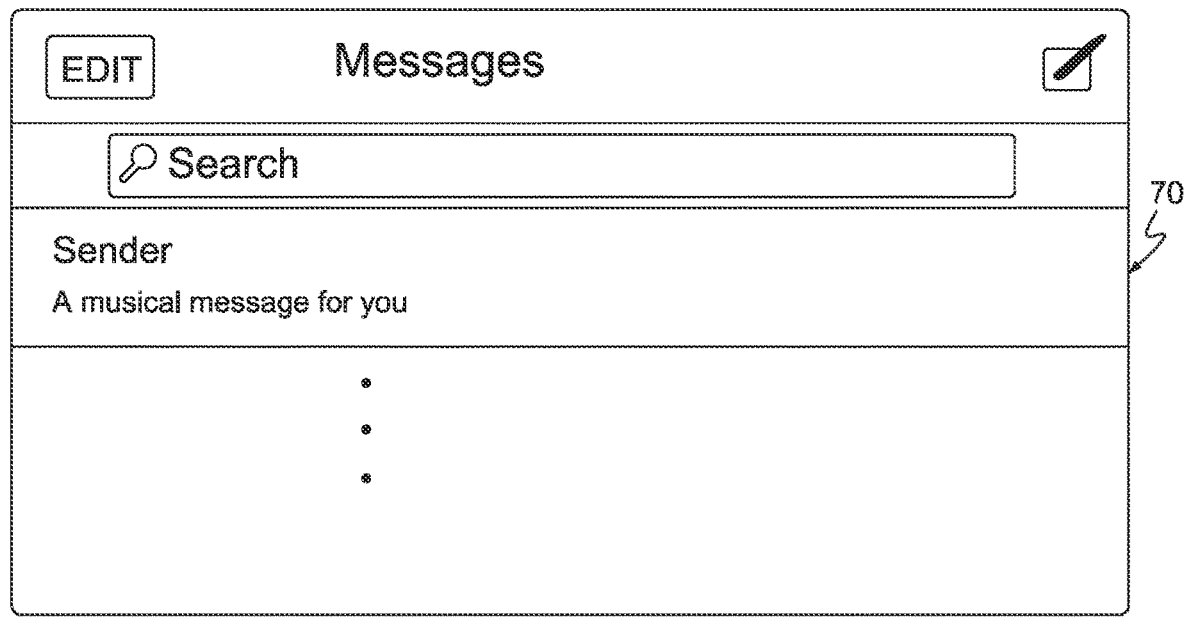
FIG. 7 shows the musical message being received by the recipient in the form of a text.

In the example of FIG. 7, the musical message 40 is received by the recipient in the form of a text 70.

Figure 8:
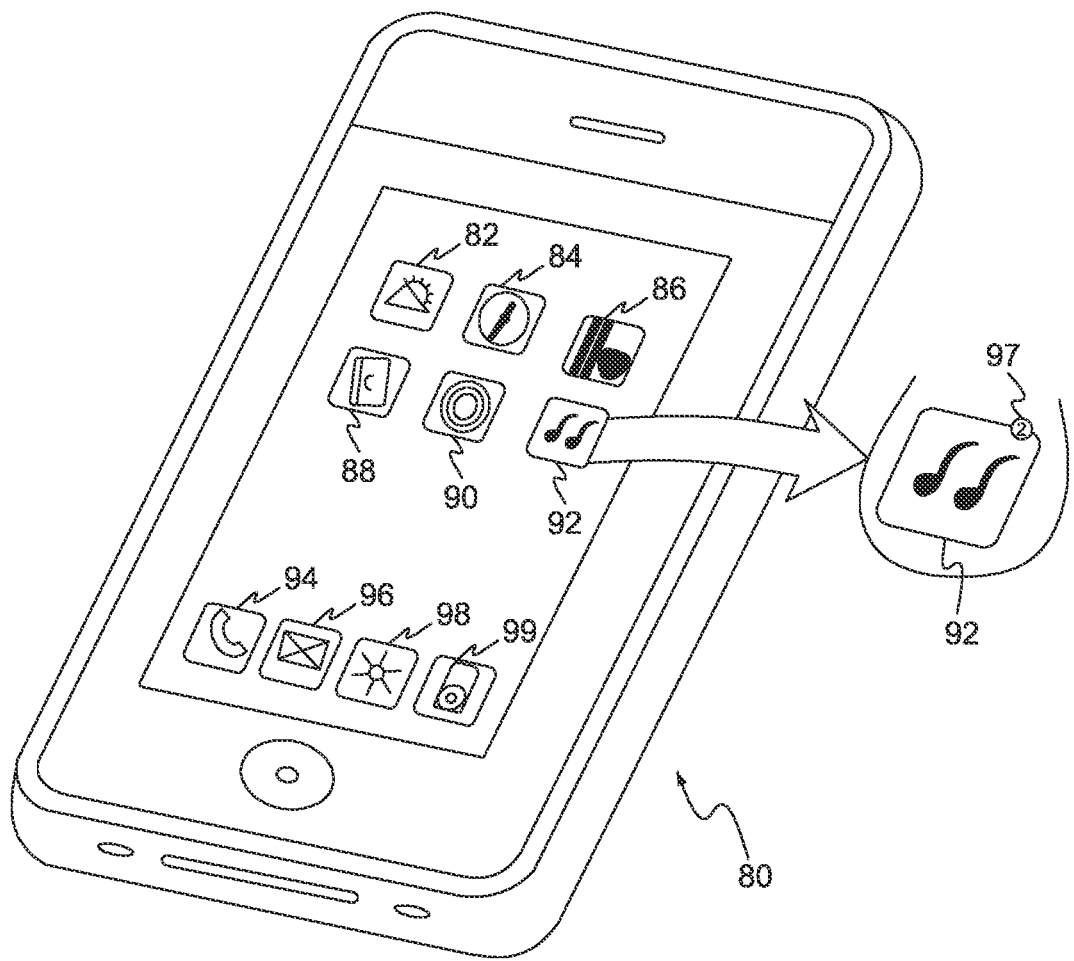
FIG. 8 shows the musical message being received by the recipient in the form of a push notification in an app.

Referring to FIG. 8, a smartphone 80 showing a plurality of apps 82-99, the musical message 40 is received by the recipient in a push notification 97 from an app 92. In each of these formats, the sender may make a selection that determines whether the recipient will be permitted play the musical message 40 only one time or multiple times. Because of this, the sender will have ultimate control over the amount of times the musical message 40 may be heard by the recipient.

Therefore, although the musical message 40 may take one of many different forms or formats, the function is the same: the musical message permits the recipient to access the musical message created by the sender, and play the message as many times as selected by the sender. Referring back to FIG. 4 again, if the user is satisfied with the message, they select the send button to send the musical message to the recipient.

Referring back to FIG. 6, when a recipient looks at their email inbox 60, they will observe that they have received a new email 62. When they select the email 62 to view, they will see the musical message 40 sent by the sender. When the email 62 is opened, the recipient observes the musical message 40 shown in FIG. 9. It should be understood that regardless of the form in which the musical message is received, (i.e. email, text, push notification, or any other format), it would function very similar to the embodiment that will be described with respect to the email example.

Figure 9:
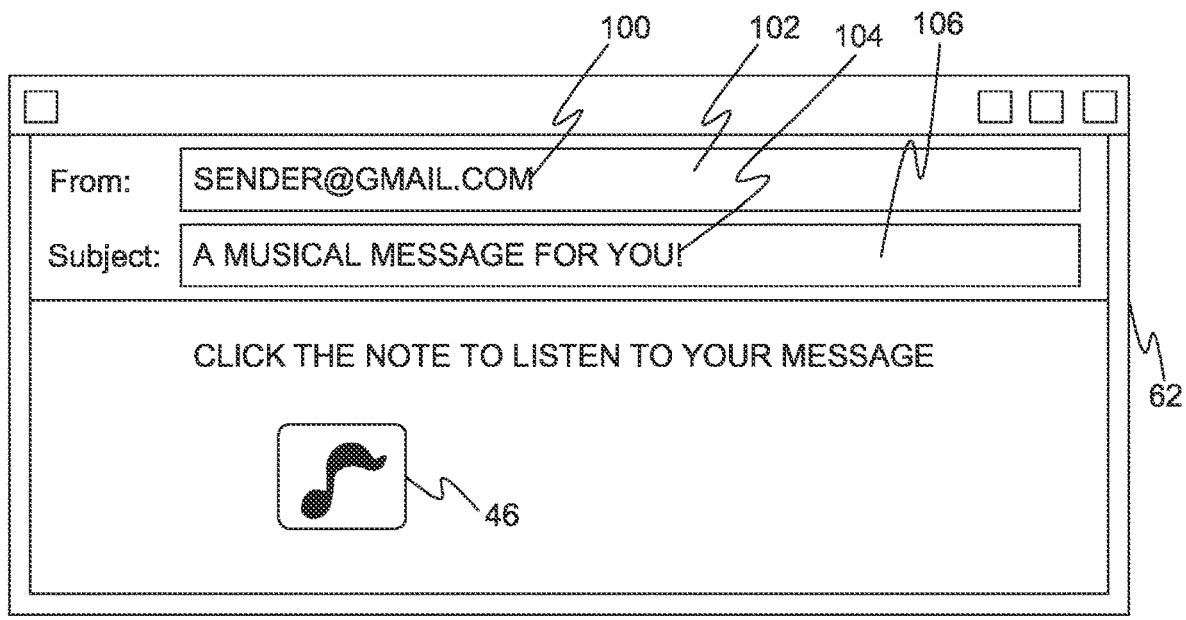
FIG. 9 shows the musical message received by the recipient after it has been opened.

Referring to FIG. 9, after the recipient opens the email 62, the recipient is presented with the sender's information 100 in the From: field 102, a subject 104 in the subject field 106, and the musical icon 46 to access the musical payload. When the recipient selects the musical icon 46, the musical payload is played to the recipient. Therefore, to access the music selection within the musical message 40, the recipient only needs to click on the music icon 46.

Figure 10:
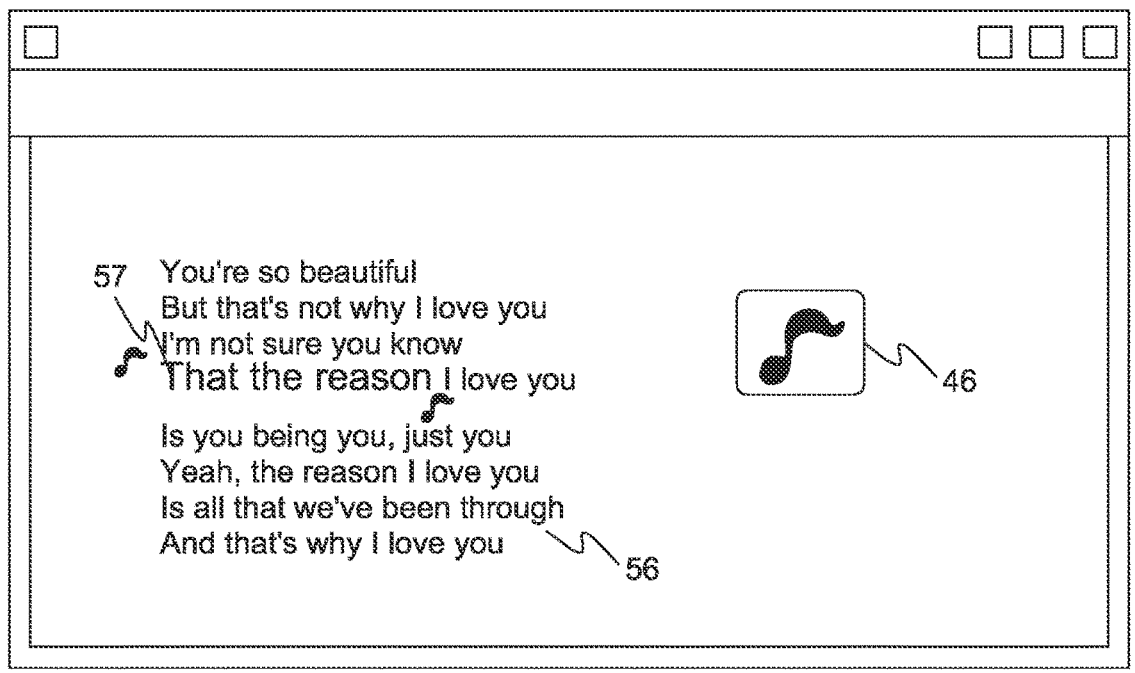
FIG. 10 shows an alternative embodiment wherein the recipient selects the musical icon shown in FIG. 9.

In an alternative embodiment shown in FIG. 10, when the recipient selects the musical icon 46 shown in FIG. 9, not only is the musical payload played for the recipient, but also the textual format of the lyrics is presented. In this embodiment, the recipient may also be guided through the textual lyrics by highlighting or other graphical means so that the recipient may effortlessly follow along in time with the music payload as it is played. This is graphically shown in FIG. 10 by the bolded and underlined words. As would be understood by those of skill in the art, this bolding and underlining 57, (or other graphical scheme being utilized), will change to highlight other words as the music in the musical payload plays out. This is similar to a karaoke machine whereby a singer is guided through a song in order to sing along with the words displayed on a screen.

Although the musical message as described hereinbefore includes a link or an actual file for the musical payload, it may not be so limited. The musical message may include other optional information as well, which will be described in greater detail hereinafter.

Figure 11:
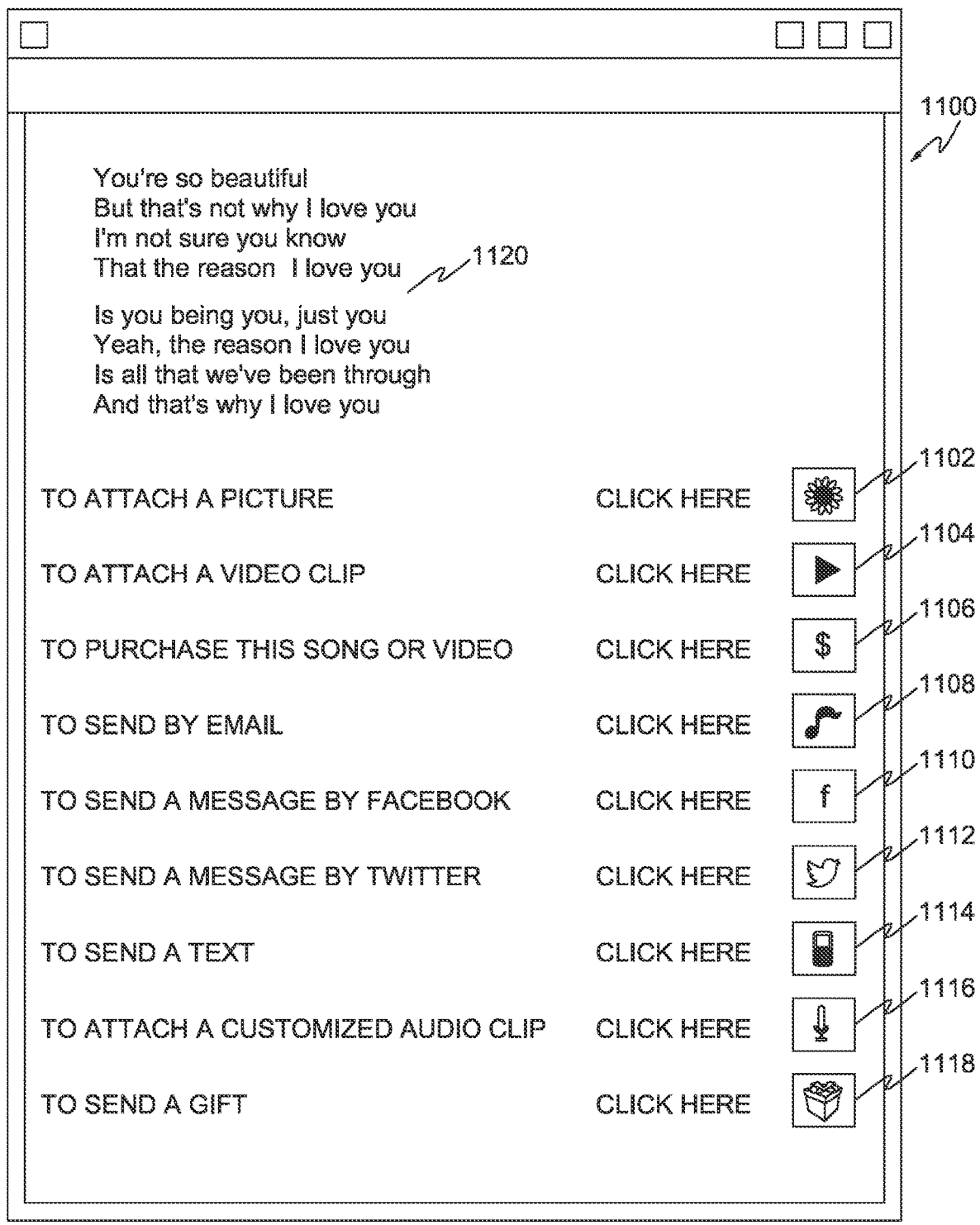
FIG. 11 shows an alternative embodiment were the send may send a plurality of different types of attachments.

It would be understood by those of skill in the art that other alternatives may be presented to the user without departing from the spirit and scope of the present invention. For example, in one alternative embodiment, shown in FIG. 11, while composing a musical message 1100 the sender may be presented with a plurality of options 1102-1118 for creating a more detailed and more customized and personal musical message. As shown, (using a different musical selection 1120 as an example), the user is presented with the option of attaching a picture 1102, attaching a video clip 1104, attaching an audio clip 1116, purchasing the musical selection for themselves or the recipient 1106, for sending a gift 1118, or for sending the message in one or more of a plurality of formats including email 1108, Facebook 1110, Twitter 1112, as a text 1114 or any other of a plurality of available formats (such as instant message or the like). This permits an extremely high level of customization.

For example the sender may wish to send a personalized gift to the recipient for their birthday. By utilizing the system described herein, the sender may make a personalized musical selection, attach or embed a photo (as will be described hereinafter), and attach an electronic gift card, (such as an Amazon gift card). This is much nicer than just texting the person with a "Happy Birthday" message.

Figure 12:
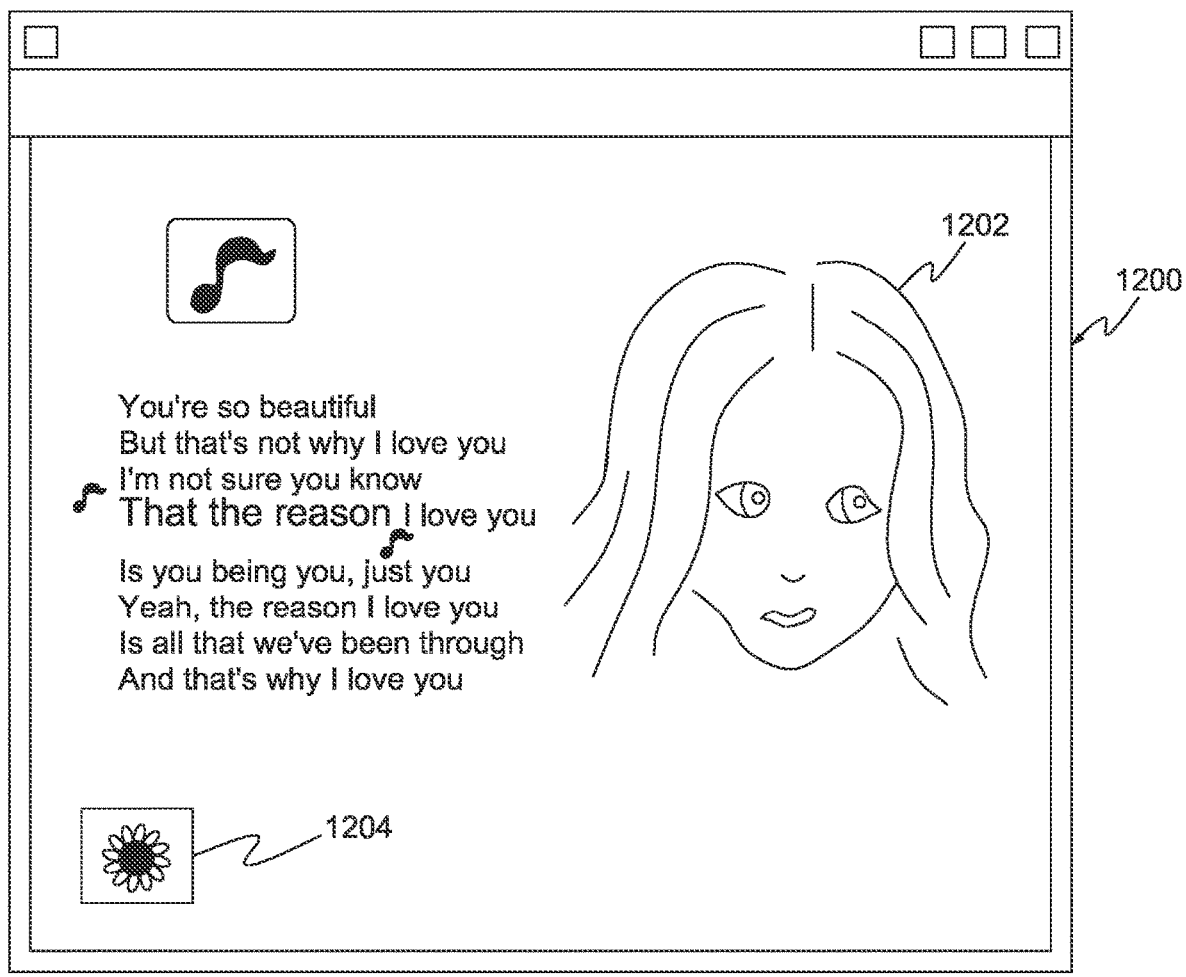
FIG. 12 shows an attachment comprising a picture, and an embodiment where the sender customizes the background.

For example, as shown in FIG. 12, musical message 1200 may include a picture, which may be an attachment 1204 to the musical message 1200 and accessed by the recipient as an attachment or a link. In yet another alternative, also shown in FIG. 12, the picture may comprise the entire background 1202 to the musical message 1200. This provides the sender to exercise a high level of creativity and customization in creating the musical message 1200 for the recipient.

Figure 13:
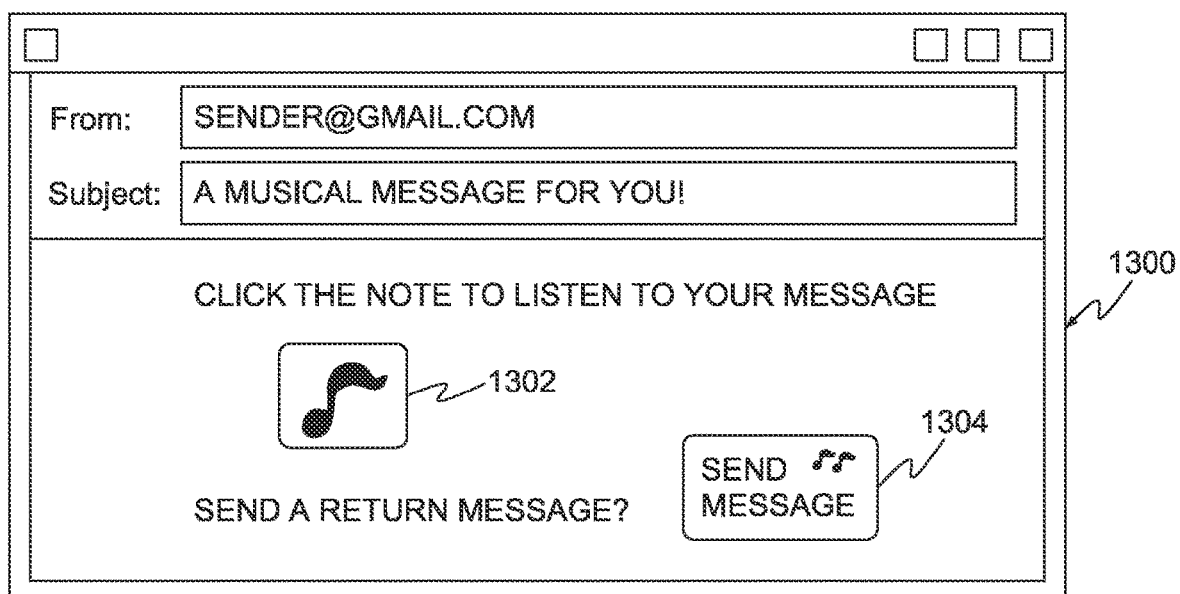
FIG. 13 shows an embodiment whereby the recipient is provided with the option of sending a return musical message.

Referring to FIG. 13, the recipient may receive a musical message 1300 which presents the recipient not only with a musical icon 1302 which permits the recipient to listen to the musical selection, but also send a reply by selecting a send message button 1304.

Once the recipient listens to the musical selection, if they want to send a reply to the musical message, they select the "Send Message" button 1304. Accordingly, the recipient then becomes the sender and they follow the process described and demonstrated through FIGS. 1-7.

Figure 14:
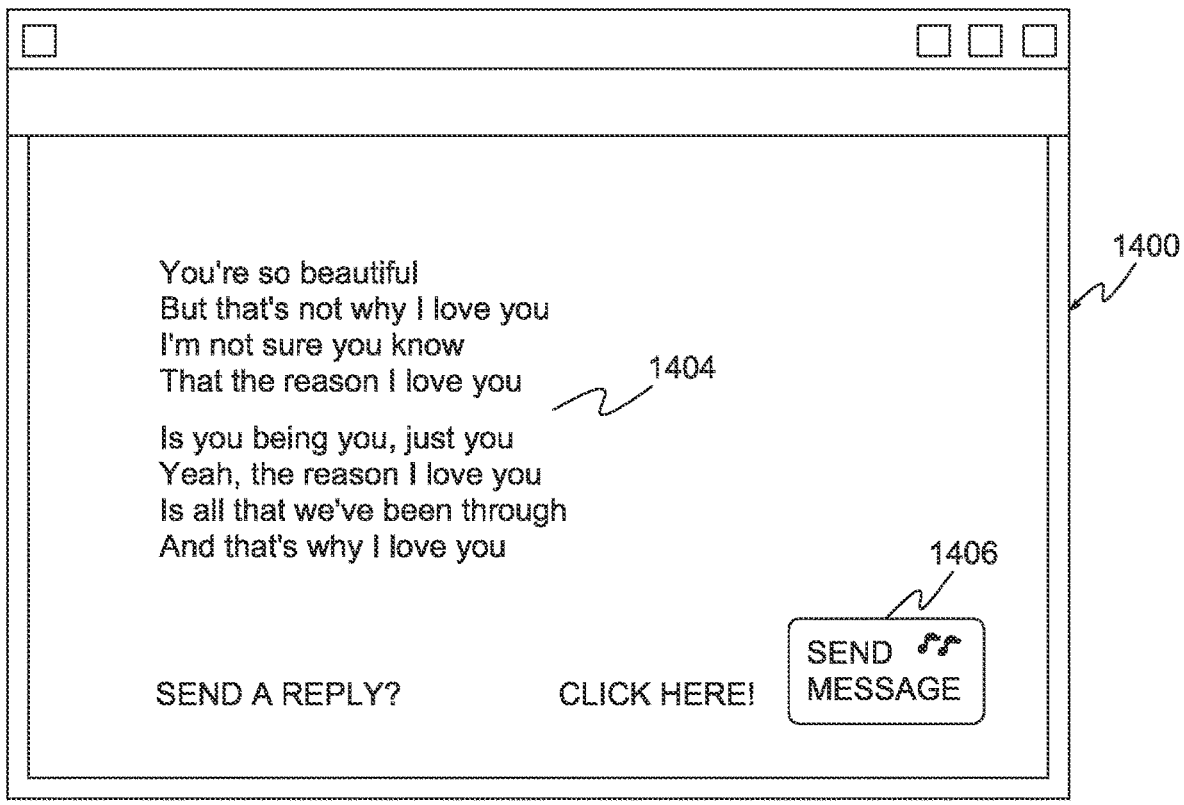
FIG. 14 shows an alternative embodiment where a new window has been opened up to play the musical payload along with textual lyrics.

FIG. 14 shows an alternative embodiment whereby after the musical icon 1302 is selected a new window 1400 has been opened up and the musical selection is played, along with textual lyrics 1404. The recipient is given the option of sending a reply message by selecting the send message button 1406 as they are listening to the musical message 1300. All of these varying embodiments are simply different options in order to streamline the invention and make the process more enjoyable for the sender and the recipient.

Figure 15:
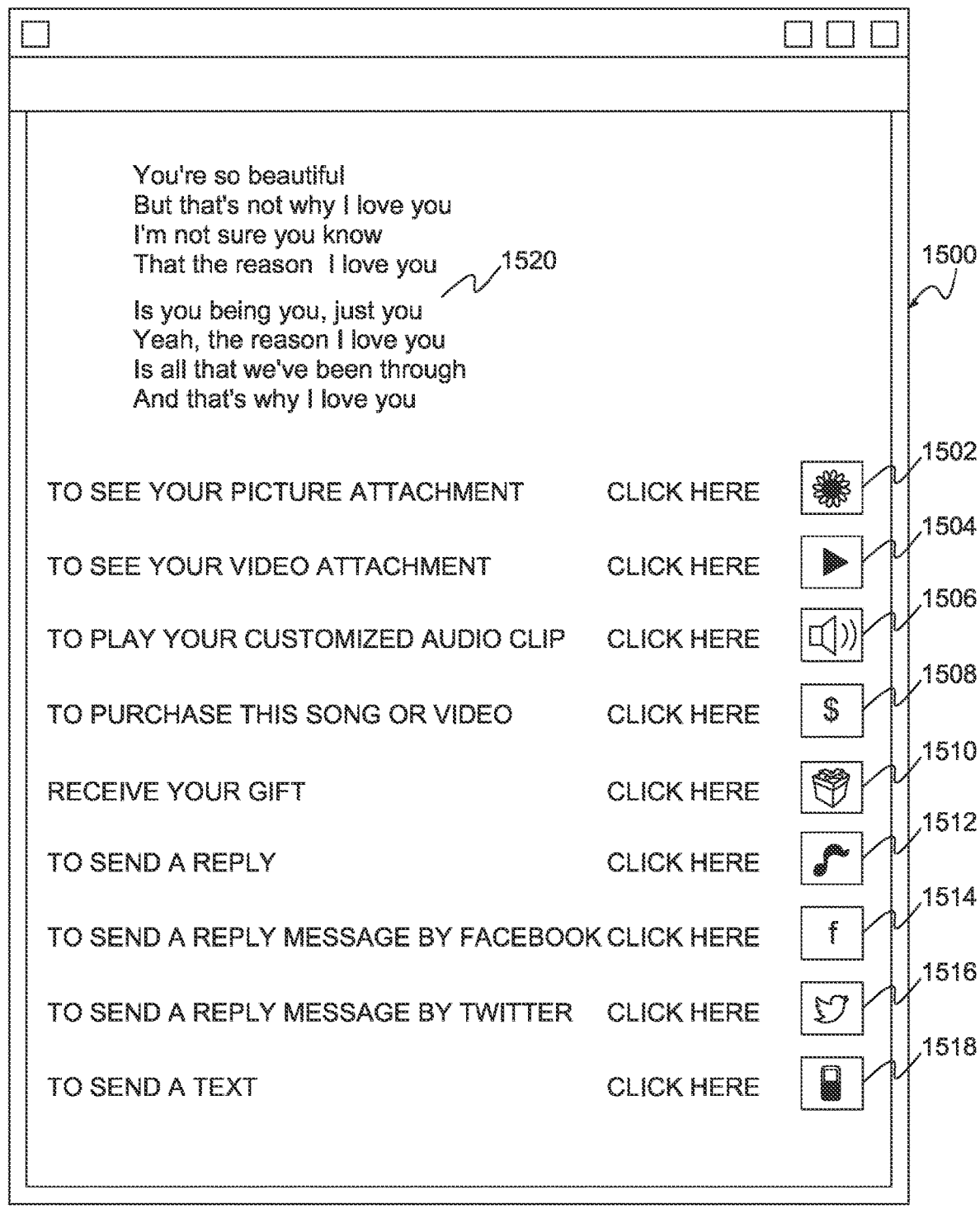
FIG. 15 shows yet another embodiment where the recipient is presented with a myriad of options.

FIG. 15 shows yet another embodiment where the recipient is sent a musical message 1500 which presents the recipient with a myriad of options 1502-1518. Those of skill in the art would realize that the specific options 1502-1518 are shown in FIG. 15 for ease of explanation and typically a sender would not select all of the options for sending to a recipient. In one alternative, a recipient only receives what the sender selects for the recipient to receive. For example, if the sender only sent a picture and a gift, the picture attachment option 1502 and the gift attachment option 1510 would be presented to the recipient, and the customized audio clip option 1506, the video attachment option 1504 and the purchased song option 1508 would not be included.

In and alternative embodiment, the recipient may be presented with certain options (for example, the picture attachment option 1502 and the gift option 1510) as selected by the sender, and may be presented with other options (for example, to send a reply 1502 or to purchase the song or video option 1508). Additionally, any of the formats of reply may be allowed, or may be restricted as selected by the sender, or automatically.

Referring to FIG. 16, an alternative embodiment 1600 of the invention is shown. This embodiment 1600 provides much more customizable search parameters then that provided in the embodiment shown in FIG. 1. In this embodiment 1600, although the search terms 1602 are still input into the search box 1604, a plurality of additional selections 1606-1630 is presented.

The first set of options 1606-1630 relates to the search parameters, which permits the sender to further customize their search, and narrows the search results as desired by the sender. In this aspect, the items that can be specified are related to the music. For example, the sender may only select lyrics from a certain genre 1606, playlist 1608, group of songs 1610, artist 1612, album 1614, composers 1616, compilations 1622 or "favorites" list 1624, or the sender may limit the search to only lyrics 1618 or titles 1620. This permits the user to set the particular parameters by which the search is conducted. Accordingly, by these selections the search parameters may apply only to titles, artists, genres or words with in a song (i.e. lyrics). The user may selectively choose one or more of these search parameters.

An additional search parameter may apply to the "length of the selection" 1630. For example, a sender may input the search terms "hold your hand" and the length of five and the search results will include only phrases with 5 or less words, such as "1 wanna hold your hand" by the Beatles.

These options also permit the sender to decide on other customizable options that do not have to do with the actual search, for example, what further attachments to include with the musical message. These options include whether to provide attachments 1632, and if so, whether to attach a picture 1634, a video 1636, text 1638, a customized audio file 1640 or a gift 1642.

The game play option 1644 permits the user to initiate a game with the recipient. Such a game could consist of who could come up with the best song with certain parameters in a specific time period for example.

An additional option of "musical buddy" 1626 allows the user and the recipient to create and add to a joint music list and use those selections sent by the sender and the recipient. Both the sender and the recipient can edit and select from that particular music list.

The song match option 1628 allows the suggestion of songs that are similar in one or more of a plurality of different parameters. This permits recommendations of musical selections that the sender may not think of, but would be pleased to be presented with. One embodiment of this may be similar to the search engine utilized by AMAZON, whereby the search engine responds with selections that other users have made. In this embodiment, selections that other senders have made bay be presented to the current sender. In the search box 1604 of FIG. 16, the search terms 1602 "I like you" has been inserted and the lyrics 1618 and title 1620 search options have been selected.

Figure 17:
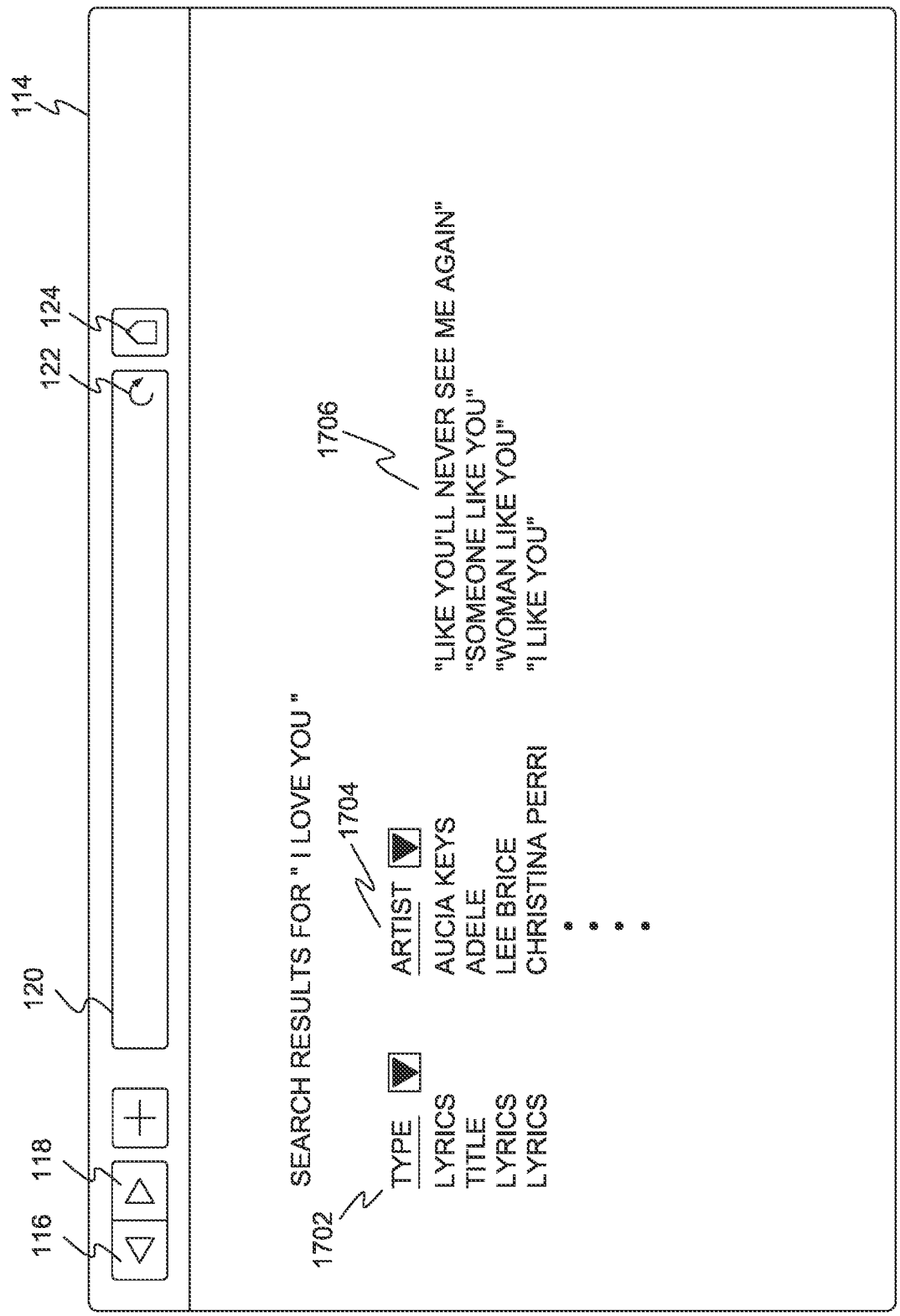
FIG. 17 shows a search conducted in accordance with the present invention.

Referring to FIG. 17, a search conducted in accordance with the search parameters set forth in FIG. 16 is shown. As presented therein, the type field 1702 includes only lyrics and titles as found by the search engine, and these are presented to the sender, (since these were the parameters selected by the sender). The artist field 1704 is shown, along with the text of the lyrics or title in the results field 1706.

Those of skill in the art would realize that a plethora of different search options, search parameters and search engines may be utilized without departing from the spirit and scope of the present invention. For example, in the most simplistic implementation of the invention, a large database including all of the parameters of all of the included songs (the aforementioned parameters including, title, artist, lyrics, genre, length of song, number of words, etc,) may be utilized and a simple searching algorithm may be employed to obtain the search results.

Figure 18:
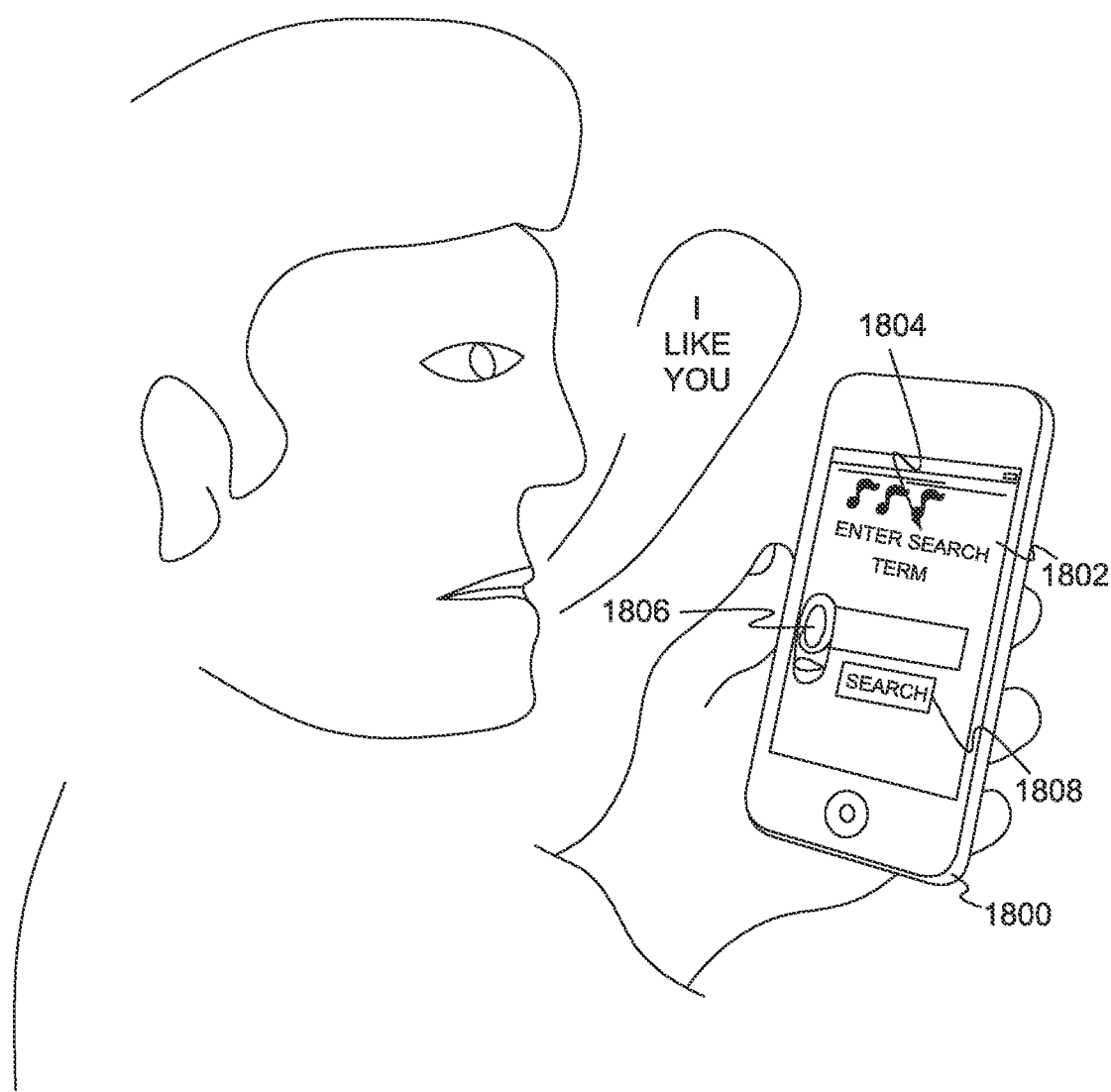
FIG. 18 shows a graphical user interface provided on a mobile handheld electronic device as utilized by a user.

The present invention will be best utilized as a social media application. Accordingly, as shown in FIG. 18, a graphical user interface (GUI) 1802 employed on a handheld device 1800 (such as a smartphone, but could include a phablet, tablet, smartwatch, or other mobile device) will be the primary avenue to access the application. As shown, the application 1804 is initiated, and the user hits the "microphone" button 1806 on the GUI 1802. The handheld device 1800 records the sound emanating from the user (which in this case is the words "I like you"), translates it into text format, and the user hits search button 1808 in order to initiate the search. Of course, it will be preferable to have a streamlined great GUI in order to make it easier on a user in the small screen environment as shown by the mobile application.

Figure 19:
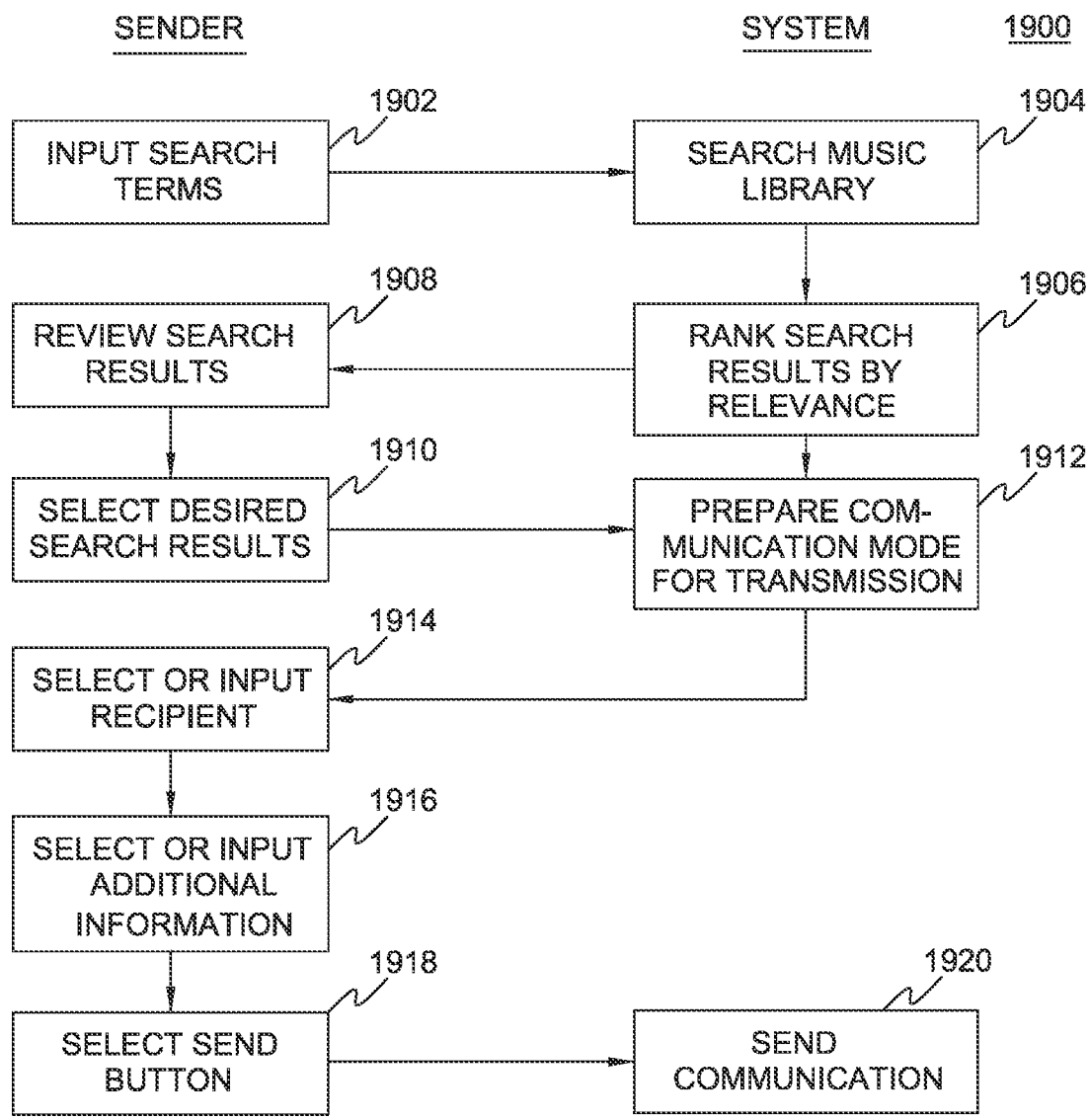
FIG. 19 is a flow diagram of a method in accordance with the present invention.

An overview of the process 1900 of the present invention from the perspective of the sender is shown in FIG. 19. Referring to FIG. 19, the sender inputs desired search terms 1902 in the search screen in order to initiate a search. As aforementioned, the sender not only enters the search terms, but may optionally enter other search parameters in order to further customize the search. The system then receives the search terms and parameters and searches all or a portion of the music library 1904, depending on said parameters. The system then retrieves search results and ranks them by their relevance 1906 to the search terms and parameters.

It, should be understood by those of skill in the art that the system may exceed the specific search parameters as set forth by the user in order to optimize search results, (for example by providing other recommendations as described above). The search results are then presented to the user 1908 as ranked by the system for relevance. The user selects 1910 the desired search results and the system utilizes the search results to prepare a communication for transmission 1914. The user first prepares the musical message by picking and choosing the desired lyrics 1910. The user then selects a recipient(s) from a list of recipients or inputs the recipient's contact information 1916. Continuing, the user may optionally input additional information or include additional information 1918 such as the aforementioned attachments for customizing the message. The user then presses the send icon 1920 and the system sends the communication to the recipient 1920.

It should be understood by those of skill in the art that although the process 1900 shown in FIG. 19 is shown as a series of sequential steps, some of these steps may be easily altered, eliminated or reordered. For example, selecting or inputting the recipient's contact information 1916, or selecting or inputting additional information 1918 such as attachments may be performed earlier in the process 1900. Likewise, if the user knows exactly which song they would like to use, several steps may be eliminated by the system, therefore streamlining the process 1900 further.

Figure 20:
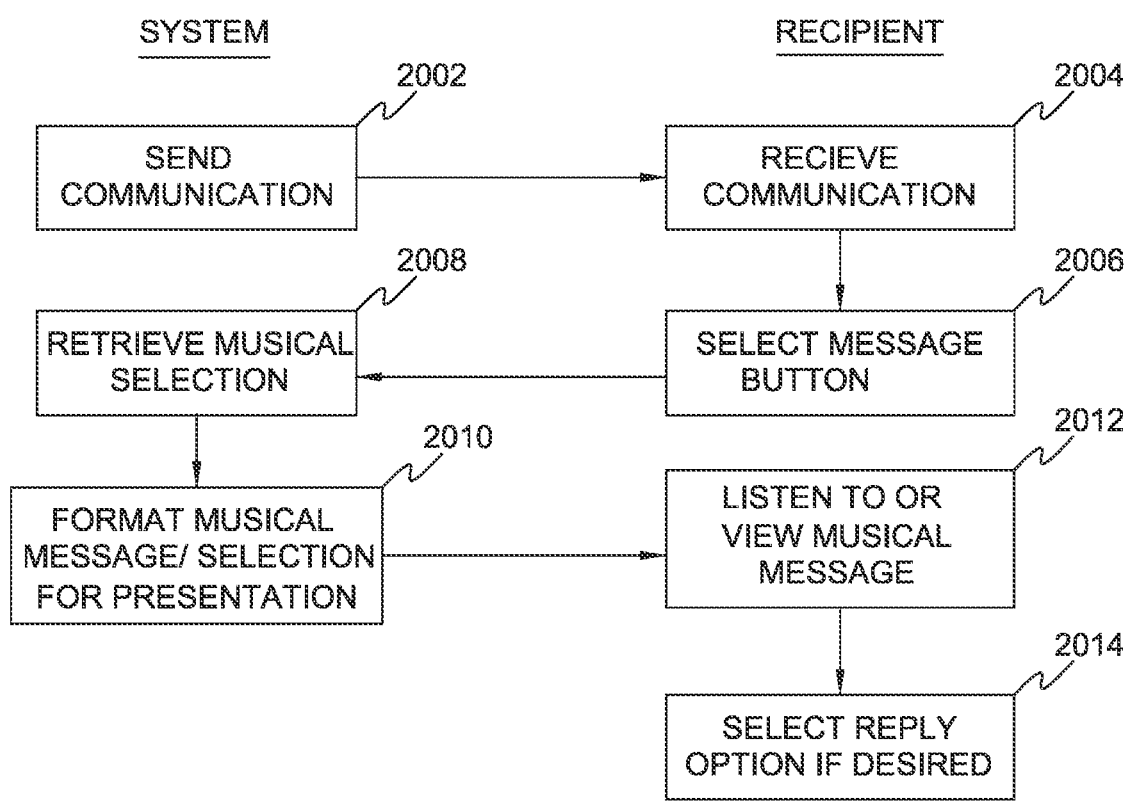
FIG. 20 is a flow diagram of an alternative method in accordance with the present invention.

An overview of the process 2000 of the present invention from the perspective of the recipient is shown in FIG. 20. The system first sends a communication 2002 to the recipient. The recipient receives and reviews the communication 2004 and selects the musical message button 2006 to initiate the payload. This selection is transmitted to the system, which retrieves the musical selection 2008, formats the musical selection for presentation 2010, and displays the musical message for the recipient. The recipient listens to or views the musical message 2012 (the amount can vary depending on the sender), and if desired they select the reply icon 2104 shown in the screen if they would like to send a musical selection in response. The recipient then has the option of replying to the sender with a text message, or a response of musical message, or a picture, or a various combinations of the aforementioned messages.

Figure 21:
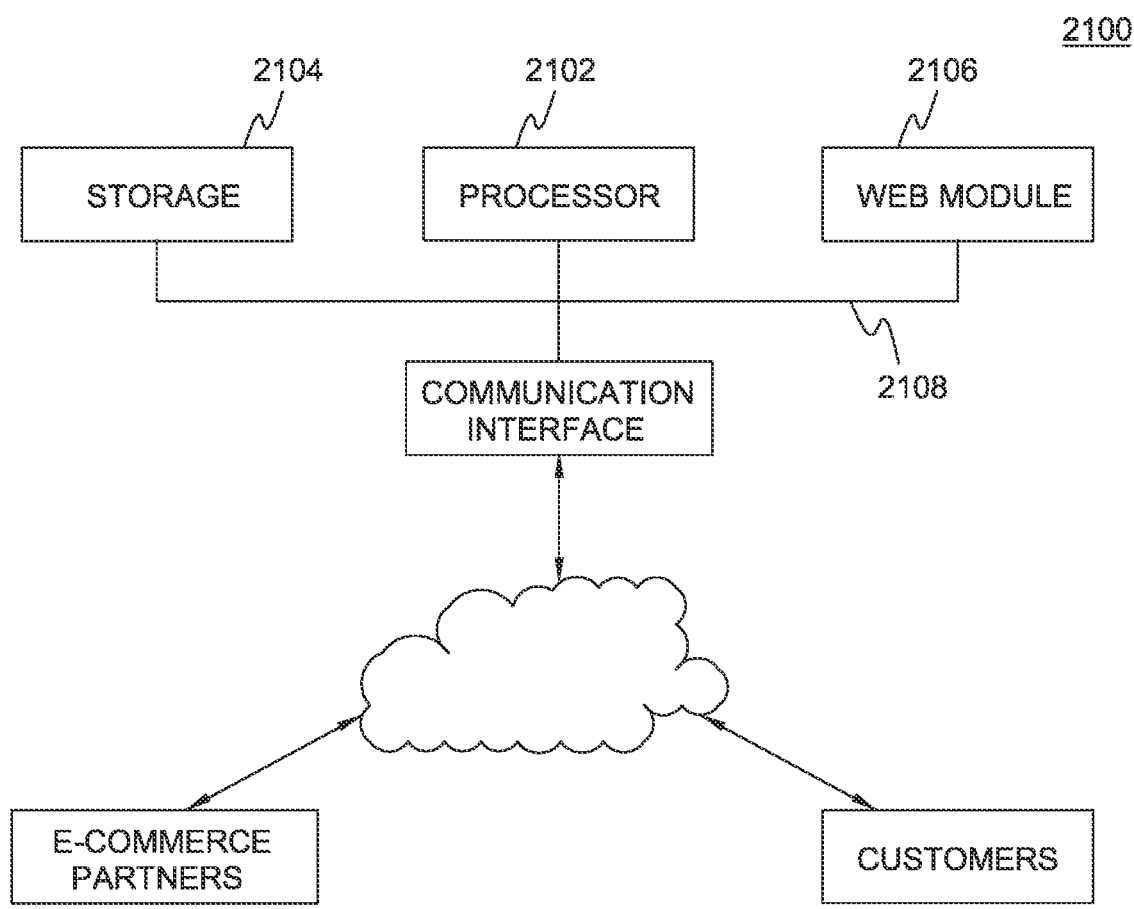
FIG. 21 is a system which implements the methods and embodiments of the present invention.

Referring to FIG. 21, a system 2100 in accordance with the present invention includes a processor 2102, a storage module 2104, and a web module 2106. It would be understood that these three components may be separate components, or may comprise a single unit. Although not explicitly shown in FIG. 21 for simplicity, one or more of these modules may be functionally linked together as appropriate. As those of skill in the art would appreciate, the modules may be embodied as physical units that are physically linked together via one or more electronic bus structures 2108, may be functional units that are functionally linked together via one or more communication protocols (not shown), or there may be a combination of physical or functional units. They may be programmed via software or firmware in a plurality of physically separate units, or may be incorporated into a single programmable unit. Accordingly, although the system 2100 may be distinct and specific units or modules, this is for convenience of explanation, and these modules, systems or units may be variously combined into one or a plurality of units without departing from the spirit and scope of the present invention.

The processor 2102 provides over control of the system 2100 and implements the search engine function, which searches the musical database. The storage module 2104 stores the musical database, and any other data needed for the system to operate, such as email addresses, credit card information, or other information for storage.

The web module 2106 facilitates generation of the musical messages between customers, or the communication between the system and e-commerce partners. The musical messages may be HyperText Markup Language (HTML) email messages, Rich Text Format (RTF) email messages, and/or may be defined according to any other current or future appropriate format. The web module 2106 may be configured to facilitate electronic communication between users of the system. The web module 2106 may communicate email messages using technologies such as Simple Mail Transfer Protocol (SMTP), Post Office Protocol (POP) technology, Internet Message Access Protocol (IMAP), Remote Procedure Call (RPC) technology, HyperText Transfer Protocol (HTTP), and/or other current or future appropriate technologies. The web module 2106 may use these technologies to transmit and/or receive email messages via one or more email servers (not depicted), which may be directly interface with system, or may be a third party service such as constant contact or mail chimp.

The web module 2106 may be, or include, an email client such as Microsoft Outlook, Thunderbird, a web browser application, or any other current or future client application for the communication of email messages.

Utilizing the teachings above, those of skill in the art would appreciate that a myriad of alternative embodiments may be implemented without departing from the spirit and scope of the present invention. For example, a user may string together a series of musical selections in order to provide a lengthier musical message. In this embodiment, the user may submit a desired message in textual format, for example a letter. The musical search engine will search for a number of songs having the lyrics that match exactly, or closely match depending upon the search parameters, the intended message. The search engine then generates the results of the musical message from the intended textual message. The sender is permitted to listen to the messages to determine if the generated musical message is what the user intended, or close to what the user intended. Once the user approves this message, they may select send message and they will be given the option of sending the musical message alone, the musical message along with another text message, the musical message along with a picture message or combination of all the aforementioned messages.

In this manner, the system of the present invention is the user complete flexibility to design a musical message in accordance with the intended meaning utilizing bits and pieces of different available songs. The system allows the flexibility of sending a short or a long musical message, either alone or with various combinations of picture, text or other type messages including other hyperlinks and attached files.

In yet a further alternative embodiment, the system permits the user to create and send musical picture books. In such an embodiment, the user creates a template of pictures, similar to a Microsoft PowerPoint or A video, and then may associate intended songs along with the pictures or video. In this manner, a user may send a musical picture book or video book to a recipient.

The present invention maybe utilized along with, incorporated as part of other present today applications or social media outlets such as YouTube, iMessage, texting or Facebook in order to provide an enhanced and lasting user experience.

In yet another embodiment, a plurality of keywords or metadata is associated and stored with each song which can be utilized later on for searching purposes. For example, a song may include the following search characterizations: romantic, male-to-female (i.e. a man singing to a woman), make-up, upbeat, ethnic, happy. Utilizing these parameters, a person (a man) looking to send a recipient (a woman) a song attempting to "make up" with them might search for a song like this. This embodiment is particularly suitable when the lyrics of a song are not literal (i.e. the actual words may be subtle and do not match the "true" meaning of the song). This would provide the search engine with a more granular and accurate search of the songs for which the user is looking.

In another alternative embodiment, a user may upload an original song with its associated lyrics, and utilize that song for sending a musical message. As part of the "game" feature, this song may be selected as one or more songs in a "song playoff" for voting upon by other users. This game may be implemented by the users to select the favorite song of the month.

In another embodiment includes a game for "naming that tune" where users can name different songs and test their knowledge of music by playing the song without the lyrics users may select among apply rowdy of different lengths of the song. For example, some users may select 12 notes, where other more experienced users may select three notes in order to "name that tune".

In all of these embodiments, the users may compete and win free downloads or other merchandise and/or, send to other users.

The present invention permits people to share not only bits and pieces of songs, but also share songs in a manner that is much more personal to them and a desired recipient. The invention permits a creator to selectively choose portions of one or more songs and tailor those portions to an intended message. Songs that are beloved may be incorporated into a user's message and playback to an intended recipient.

The present invention allows people to utilize and experience songs in a manner that is personal to them and a recipient, unlike any form or format that has been utilized today.

What is claimed is:

1. A messaging device that enables improved communication between a user and a recipient using music, comprising:

an input;
a display;
a communication interface that is communicatively coupled to a server, wherein the server stores a database of information relating to a plurality of songs, including at least title, album, artist, lyrics, and related audio files; and
one or more processors that are communicatively coupled to the input, the display and the communication interface, wherein the one or more processors are configured to:
receive, using the input, a message from the user of the messaging device, wherein the message contains textual information that comprises a plurality of keywords,
transmit, using the communication interface, the message to the server, receive, using the communication interface, a new message that contains the textual information and a musical message, wherein the musical message is automatically generated by the server by selecting and combining non-contiguous audio snippets from a plurality of different songs in the database based on a semantic analysis of the plurality of keywords,
present, using the display, the new message and a link to the user, wherein the link when activated causes the musical message to play, and
transmit, using the communication interface, a recipient message to the recipient, wherein recipient message includes the new message and the link.

2. The messaging device of claim 1, wherein the recipient message is transmitted to the recipient using Simple Mail Transfer Protocol (SMTP) or a Short Message Service (SMS).

3. The messaging device of claim 1, wherein playing of the musical message causes a respective keyword in the textual information to become highlighted on the display when each respective bit of the plurality of respective different songs is played.

4. The messaging device of claim 1, wherein the new message further includes lyrics for each of the non-contiguous audio snippets contained in the musical message.

5. The messaging device of claim 1, wherein each bit of the plurality of respective different songs is a predetermined length.

6. The messaging device of claim 1, wherein the recipient message further includes an option of sending a reply electronic message including a new musical message.

7. The messaging device of claim 1, wherein the input is a microphone.

8. A method that enables improved communication between a user and a recipient using music, comprising:
receiving, by a processor of a messaging device, a message from the user of the messaging device, wherein the message contains textual information that comprises a plurality of keywords;
transmitting, by the processor, the message to a server that is communicatively coupled to the processor via a communication interface, wherein the server stores a database of information relating to a plurality of songs, including at least title, album, artist, lyrics, and related audio files;
receiving, by the processor a new message that contains the textual information and a musical message via the communication interface, wherein the musical message is automatically generated by the server by selecting and combining non-contiguous audio snippets from a plurality of different songs in the database based on a semantic analysis of the plurality of keywords, presenting, by the processor, the new message and a link to the user on a display, wherein the link when activated causes the musical message to play; and
transmitting, by the processor, a recipient message to the recipient via the communication interface, wherein recipient message includes the new message and the link.

9. The method of claim 8, wherein the recipient message is transmitted to the recipient using Simple Mail Transfer Protocol (SMTP) or a Short Message Service (SMS).

10. The method of claim 8, wherein playing of the musical message causes a respective keyword in the textual information to become highlighted on the display when each respective each bit of the plurality of respective different songs is played.

11. The method of claim 8, wherein the new message further includes lyrics for each of the non-contiguous audio snippets contained in the musical message.

12. The method of claim 8, wherein each non-contiguous audio snippets of the plurality of respective different songs is a predetermined length.

13. The method of claim 8, wherein the recipient message further includes an option of sending a reply electronic message including a new musical message.

14. The method of claim 8, wherein the message is received by the processor using a microphone.

15. A non-transitory computer readable storage medium that stores instructions for enabling improved communication between a user and a recipient using music, the instructions when executed by a processor of a messaging device, cause the processor to execute a method comprising:
receiving, by the, a message from the user of the messaging device, wherein the message contains textual information that comprises a plurality of keywords;
transmitting, by the processor, the message to a server that is communicatively coupled to the processor via a communication interface, wherein the server stores a database of information relating to a plurality of songs, including at least title, album, artist, lyrics, and related audio files;
receiving, by the processor a new message that contains the textual information and a musical message via the communication interface, wherein the musical message is automatically generated by the server by selecting and combining non-contiguous audio snippets from a plurality of different songs in the database based on a semantic analysis of the plurality of keywords;
presenting, by the processor, the new message and a link to the user on a display, wherein the link when activated causes the musical message to play;
and transmitting, by the processor, a recipient message to the recipient via the communication interface, wherein recipient message includes the new message and the link.

16. The non-transitory computer readable storage medium of claim 15, wherein playing of the musical message causes a respective keyword in the textual information to become highlighted on the display when each respective bit of the plurality of respective different songs is played.

17. The non-transitory computer readable storage medium of claim 15, wherein the new message further includes lyrics for each of the non-contiguous audio snippets contained in the musical message.

18. The non-transitory computer readable storage medium of claim 15, wherein each bit of the plurality of respective different songs is a predetermined length.

19. The non-transitory computer readable storage medium of claim 15, wherein the recipient message further includes an option of sending a reply electronic message including a new musical message.

20. The non-transitory computer readable storage medium of claim 15, wherein the message is received by the processor using a microphone.

* * * * *